United States Patent
Floury et al.

(10) Patent No.: US 10,810,801 B2
(45) Date of Patent: Oct. 20, 2020

(54) METHOD OF DISPLAYING AT LEAST ONE VIRTUAL OBJECT IN MIXED REALITY, AND AN ASSOCIATED TERMINAL AND SYSTEM

(71) Applicant: ORANGE, Paris (FR)

(72) Inventors: Cedric Floury, Chatillon (FR); Jean Cartigny, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/201,242

(22) Filed: Nov. 27, 2018

(65) Prior Publication Data
US 2019/0164347 A1    May 30, 2019

(30) Foreign Application Priority Data
Nov. 28, 2017  (FR) ..................................... 17 61321

(51) Int. Cl.
*G06T 19/00*      (2011.01)
*G06F 3/0481*   (2013.01)
(Continued)

(52) U.S. Cl.
CPC .......... *G06T 19/006* (2013.01); *G06F 3/0481* (2013.01); *G06F 3/04845* (2013.01); *G06F 3/1423* (2013.01); *G06F 3/1454* (2013.01); *G09G 5/14* (2013.01); *G02B 27/0172* (2013.01); *G02B 2027/014* (2013.01); *G02B 2027/0178* (2013.01); *G06F 3/017* (2013.01); *G09G 2340/145* (2013.01); *G09G 2354/00* (2013.01)

(58) Field of Classification Search
CPC . G06T 19/006; G06F 3/0481; G06F 3/04845; G06F 3/017; G02B 2027/0178
See application file for complete search history.

(56) References Cited

U.S. PATENT DOCUMENTS 9,858,720 B2 * 1/2018 da Veiga ............ G02B 27/0172
10,001,645 B2 * 6/2018 Norden .................. G02B 27/01
(Continued)

FOREIGN PATENT DOCUMENTS

| CN | 102395948 A * | 3/2012 | ........... G06T 19/006 |
| WO | 2015108887 A1 | 7/2015 | |
| WO | 2016014876 A1 | 1/2016 | |

OTHER PUBLICATIONS

French Search Report and Written Opinion dated Aug. 8, 2018 for corresponding French Application No. 1761321, filed Nov. 28, 2017.

*Primary Examiner* — Michael Pervan
(74) *Attorney, Agent, or Firm* — David D. Brush; Westman, Champlin & Koehler, P.A.

(57) ABSTRACT

A method of displaying in mixed reality at least one virtual object. The method includes comprising the following steps that are performed by a first terminal: sending at least one position data element of a pointer positioned on a portion of a first window of a computer application, said first window being displayed by a second terminal; receiving at least one data element relating to the portion of the first window; and processing the at least one data element relating to the portion of the first window, so as to display the at least one virtual object in mixed reality on the basis of the at least one data element relating to the portion of the first window.

9 Claims, 3 Drawing Sheets

(51) Int. Cl.
*G06F 3/0484* (2013.01)
*G02B 27/01* (2006.01)
*G06F 3/01* (2006.01)
*G06F 3/14* (2006.01)
*G09G 5/14* (2006.01)

(56) References Cited

U.S. PATENT DOCUMENTS

| | | | |
|---|---|---|---|
| 2015/0205106 A1* | 7/2015 | Norden | G02B 27/01 345/7 |
| 2016/0027216 A1* | 1/2016 | da Veiga | G02B 27/0172 345/419 |
| 2016/0147492 A1* | 5/2016 | Fugate | G09G 3/001 345/633 |
| 2018/0101994 A1* | 4/2018 | Da Veiga | G02B 27/0172 |

\* cited by examiner

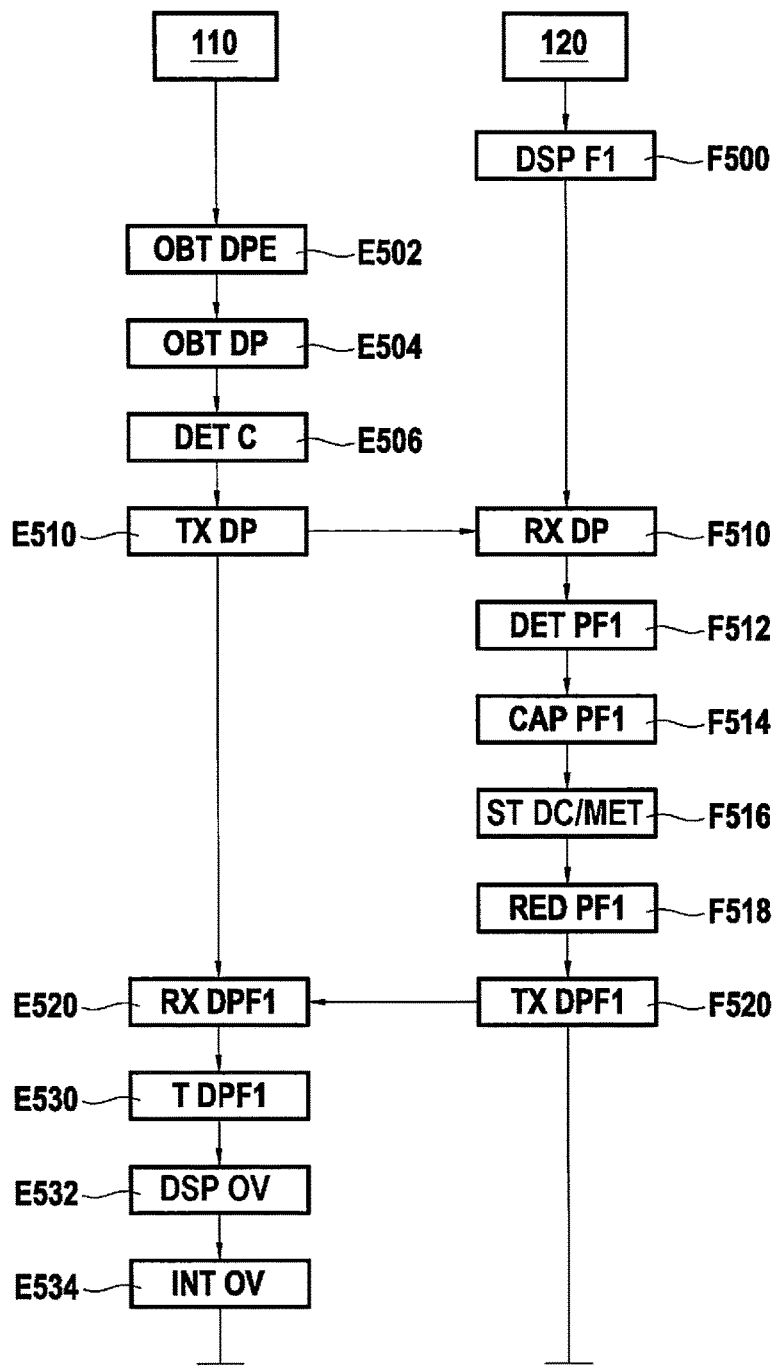
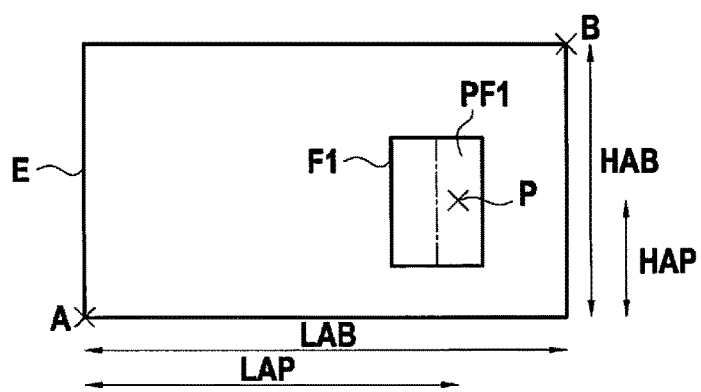
FIG.5
FIG.6

METHOD OF DISPLAYING AT LEAST ONE VIRTUAL OBJECT IN MIXED REALITY, AND AN ASSOCIATED TERMINAL AND SYSTEM

BACKGROUND OF THE INVENTION

The present invention relates to the general field of mixed reality, sometimes also called hybrid reality, and it relates more particularly to a method of displaying at least one virtual object in mixed reality.

The user of a terminal such as a computer often needs to use a plurality of computer applications simultaneously, e.g. word processor software together with an electronic mail application.

Nevertheless, the small size of the screen of the terminal often does not make it possible to display simultaneously all of the windows of the applications in use, in such a manner as to make them clearly visible to the user.

By way of example, the display of certain applications may be reduced merely to an icon, so the user no longer has any visual feedback about those applications and needs to perform control operations in order to cause those applications to be displayed again.

There therefore exists a need for a solution that enables the simultaneous display of a plurality of applications to be improved.

OBJECT AND SUMMARY OF THE INVENTION

The present invention relates to a method of displaying in mixed reality at least one virtual object, the method comprising the following steps performed by a first terminal:
  a send step for sending at least one position data element of a pointer positioned on a portion of a first window of a computer application, the first window being displayed by a second terminal;
  a receive step for receiving at least one data element relating to the portion of the first window; and
  a processing step for processing the at least one data element relating to the portion so as to display the at least one virtual object in mixed reality on the basis of the at least one data element relating to the portion.

Thus, a user of the first terminal can extend the display of computer applications in use away from the display device of the second terminal. A large number of virtual objects corresponding to these applications can be displayed simultaneously.

In a particular implementation, the at least one virtual object is a second window of the computer application.

In a particular implementation, the method further comprises the following steps, performed by the first terminal:
  an obtaining step for obtaining at least one position data element of a display device of the second terminal displaying the first window, in real surroundings in which the first terminal and the second terminal are positioned; and
  an obtaining step for obtaining at least one position data element of the pointer, the at least one position data element of the pointer being a position data element for the pointer relative to the display device.

In a particular implementation, the send step is performed on detecting a command for displaying the at least one virtual object In a particular implementation, the receive step comprises receiving:
  at least one capture of the portion of the first window in a digital image format; and/or
  at least one context data element relating to the portion of the first window; and/or
  at least one metadata element relating to the portion of the first window.

In a particular implementation, the first terminal is a mixed reality headset or a pair of mixed reality goggles.

In a particular implementation, the method further comprises a reduction step performed by the second terminal for reducing the portion of the first window In a particular implementation, the method further comprises a determination step performed by the second terminal for determining the portion of the first window from the at least one position data element of the pointer.

Furthermore, the invention provides a mixed reality terminal suitable for performing a method as described below.

Also, the invention provides a system suitable for performing a method as described above, including a terminal as described above.

In a particular embodiment, the various steps of the mixed reality display method of the invention for displaying at least one virtual object of the invention are determined by computer program instructions.

Consequently, the invention also provides a computer program on a data medium, the program including instructions adapted to performing steps of a mixed reality display method for displaying at least one virtual object in accordance with the invention.

The program may use any programming language, and it may be in the form of source code, object code, or code intermediate between source code and object code, such as in a partially compiled form, or in any other desirable form.

The invention also provides a computer readable data medium, including instructions of a computer program as mentioned above.

The data medium may be any entity or device capable of storing the program. For example, the medium may comprise storage means such as a read only memory (ROM), for example a compact disk (CD) ROM or a microelectronic circuit ROM, or indeed magnetic recording means, e.g. a hard disk.

Furthermore, the data medium may be a transmissible medium such as an electrical or optical signal that can be conveyed via an electrical or optical cable, by radio, or by other means. The program of the invention may in particular the downloaded from a network of the Internet type.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show an implementation having no limiting character. In the figures:

FIGS. 4 and 5 are flow charts showing the main steps of mixed reality display methods for displaying at least one virtual object, in implementations of the invention; and FIG. 6 is a diagram showing the screen of a second terminal of a mixed reality display system for displaying at least one virtual object in an embodiment of the invention.

DETAILED DESCRIPTION OF IMPLEMENTATIONS

Figure 1:
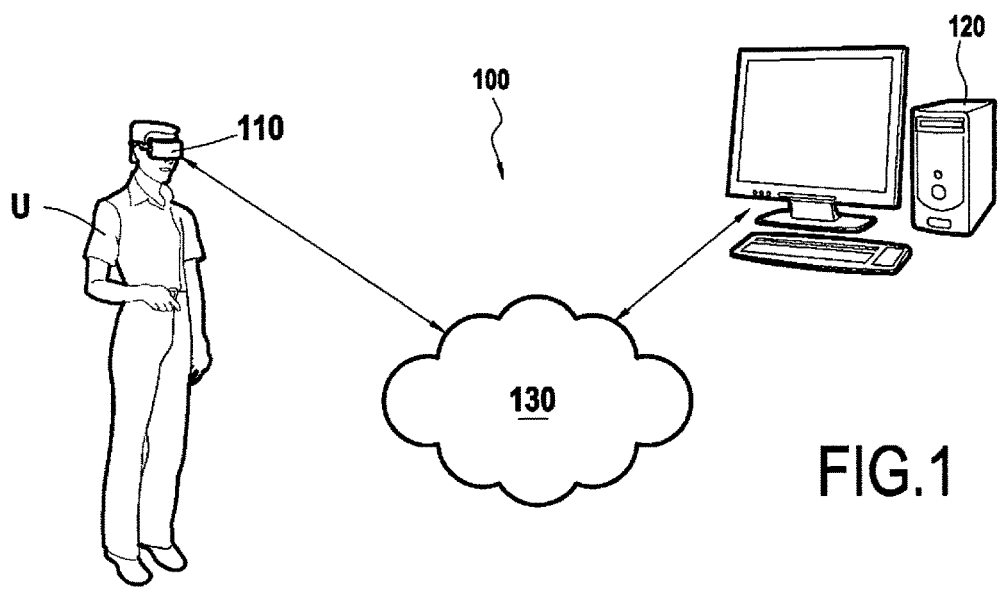
FIG. 1 is a diagram of a mixed reality display system for displaying at least one virtual object, in an embodiment of the invention.

FIG. 1 is a diagram showing a mixed reality display system 100 for displaying at least one virtual object, and suitable for implementing a mixed reality display method for displaying at least one virtual object in an implementation of the invention.

Mixed reality is technology that enables a virtual world to be melded with the real world so as to produce new surroundings and displays in which both physical objects of the real world and also digital objects of the virtual world coexist and may possibly interact, e.g. in real time. Mixed reality makes it possible to display virtual objects by means of a display device so as to superpose them on the real world.

The system 100 comprises a first terminal 110 and may also comprise a second terminal 120. The first terminal 110 and the second terminal 120 may communicate with each other by means of a telecommunications network 130, e.g. an Internet type network (e.g. WiFi), a Bluetooth network, or a fixed or mobile telephone network (of 3G, 4G, etc. type).

Figure 2A:
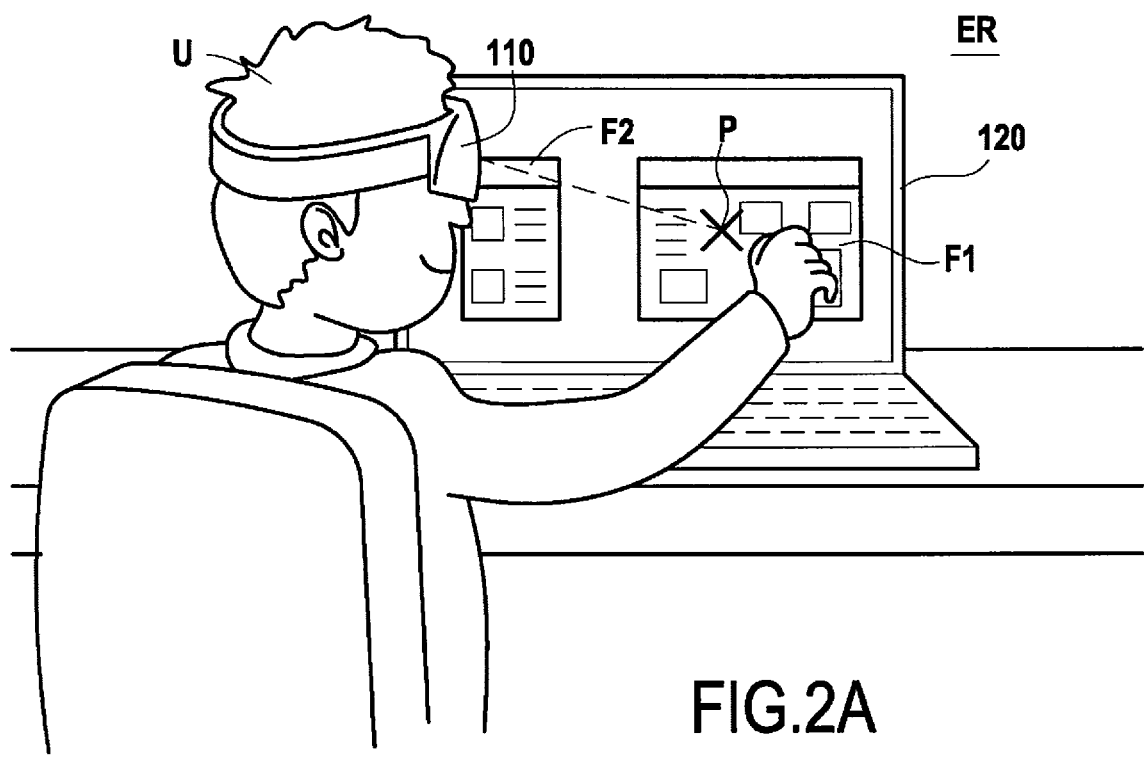
FIGS. 2A and 2B are diagrams showing first and second terminals of a mixed reality display system for displaying at least one virtual object, in an embodiment of the invention.

FIG. 2A shows an example of a first terminal 110 and of a second terminal 120, in which the first terminal 110 is a pair of mixed reality goggles worn by the user while the second terminal 120 is a computer. The screen of the second terminal displays two windows F1 and F2 of computer applications. The user U of the first terminal 110 and of the second terminal 120 can position a pointer P of the first terminal 110 on a portion of one of the two windows F1 by gazing at that portion.

The user U can also make a movement of grasping the portion of the first window F1, this grasping movement being interpreted by the first terminal 110 as being a command to display the portion of the first window F1.

Figure 2B:
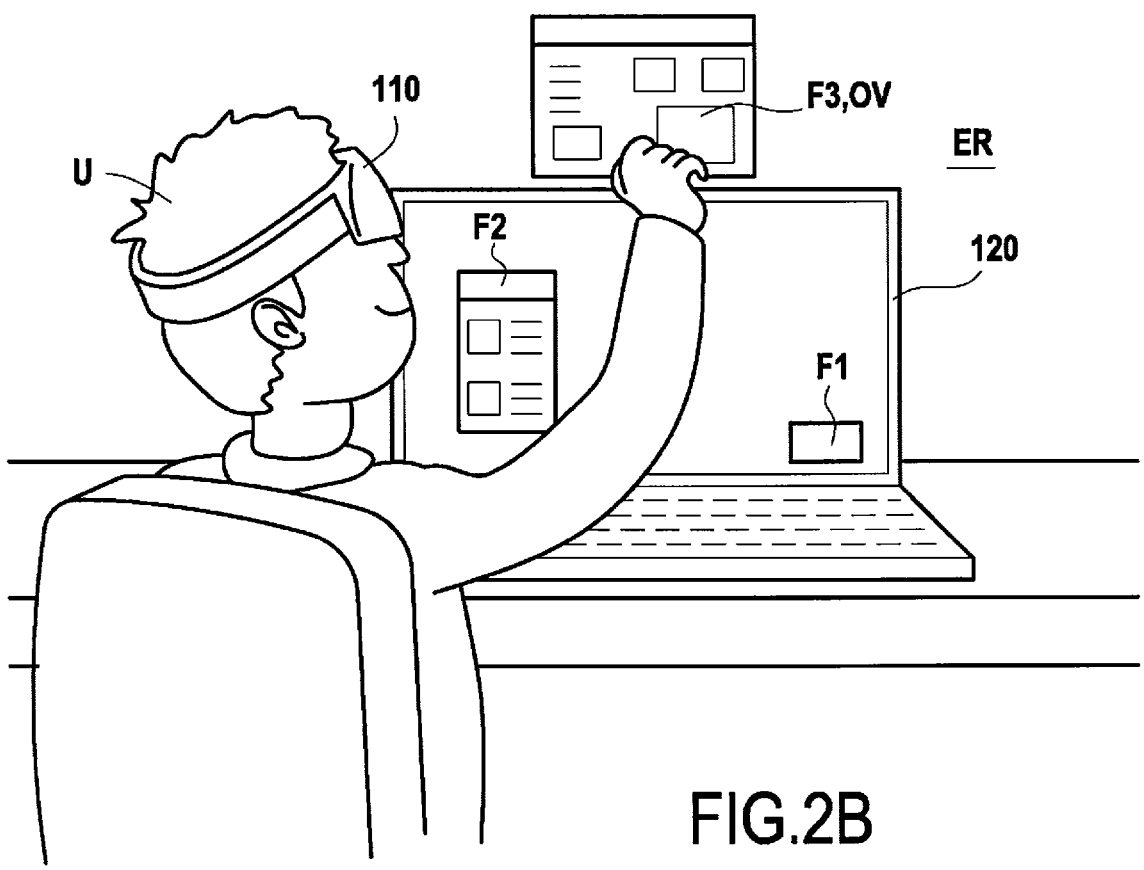

The second terminal 120 can then send data to the first terminal 110 relating to the pointed-to window F1 so that the first terminal 110 can display a new window F3 on the basis of this data (see FIG. 2B). The second terminal 120 can then stop displaying the window F1 or can reduce it.

The user U is then free to move the new window F3. The user can also interact with this new window F3.

The first terminal 110 is typically a pair of mixed reality goggles, such as the "Microsoft Hololens" (registered trademark) goggles, or a mixed reality headset. In a variant, the first terminal 110 may be a mobile terminal, such as a smartphone type portable telephone or a digital tablet.

By way of example, the second terminal 120 is a fixed or mobile terminal such as a computer, typically a personal computer, a smartphone type mobile telephone, a digital tablet, or a digital television set.

The first terminal 110 includes a pointer module, a send module for sending position data, a receive module for receiving first window portion data, and a processor module for processing real surroundings data and first window portion data. Furthermore, the first terminal 110 may include an obtaining module for obtaining position data, an acquisition module for acquiring real surroundings data, and/or a display device for displaying a virtual object.

The display device in one example is a transparent or semitransparent screen on which a virtual object can be displayed, the virtual object typically taking the form of a hologram. The transparent screen may be positioned in front of the user's eyes, so that the user sees the virtual object displayed on the screen and the real surroundings through the screen. The transparent screen is thus typically mounted on a pair of mixed reality goggles or on a mixed reality headset.

In another example, the display device is a screen capable of displaying an image coming from the real world, typically acquired by the acquisition module, with it being possible to superpose a virtual object on that image.

In an example, the acquisition module is a moving or still camera, and/or a depth sensor.

The send and/or receive modules may comprise one or more long-range communications modules, such as for example a WiFi submodule and/or a plurality of short-range communications submodules, such as for example near-field communication (NFC) or Bluetooth submodules.

In addition, the second terminal 120 may include a display device, a receive module for receiving position data, a processor module for processing position data, a capture module for capturing a first window portion, a storage module for storing first window portion data, a reduction module for reducing the first window portion and/or a send module for sending first window portion data.

Figure 3A:
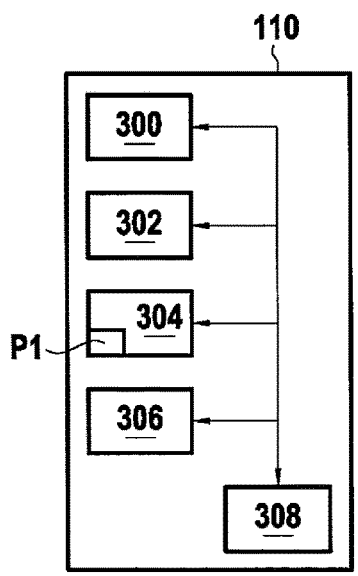
FIGS. 3A and 3B are diagrams respectively of a first terminal and of a second terminal of the FIG. 1 system.

As shown in FIG. 3A, the first terminal 110 presents the conventional architecture of a computer. The first terminal 110 comprises in particular a processor 300, a ROM 302, a rewritable non-volatile memory 304 (e.g. of electrically erasable programmable read only memory (EEPROM) type or of "flash NAND" type), a rewritable volatile memory 306 (of random access memory (RAM) type), and a communications interface 308.

The ROM 302 of the first terminal 110 constitutes a data medium in accordance with an embodiment of the invention that is readable by the processor 300 and that stores a computer program P1 in accordance with an embodiment of the invention. In a variant, the computer program P1 is stored in the rewritable non-volatile memory 304.

The computer program P1 defines functional and software modules that are configured in this example to perform steps of a mixed reality display method for displaying at least one virtual object in accordance with an implementation of the invention. These functional modules rely on or control the above-mentioned hardware elements 300, 302, 304, 306, and 308 of the first terminal 110. In particular in this example, they comprise the pointer module, the send module, the receive module, the processor module, and possibly also the obtaining module and/or the acquisition module.

Figure 3B:
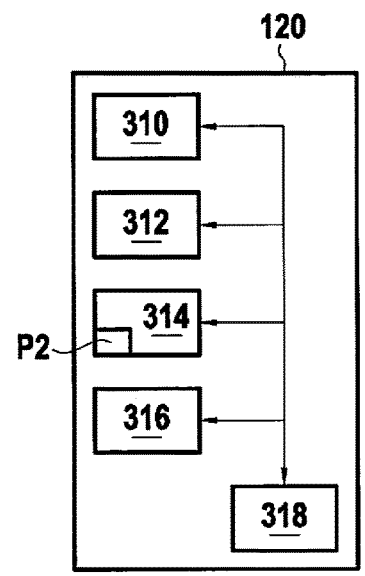

In addition, as shown in FIG. 3B, the second terminal 120 also presents the conventional architecture of a computer, by comprising a processor 310, a ROM 312, a rewritable non-volatile memory 314 (of EEPROM or flash NAND type, for example), a rewritable volatile memory 316 (of RAM type), and a communications interface 318.

Like the first terminal 110, the ROM 312 (or the rewritable volatile memory 314) of the second terminal 120 constitutes a data medium in accordance with an embodiment of the invention that is readable by the processor 310 and that stores a computer program P2 in accordance with an embodiment of the invention.

The computer program P2 defines the functional and software modules that are configured in this example to implement steps of a mixed reality display method for displaying at least one virtual object in accordance with an implementation of the invention. In particular, they comprise the receive module, the processor module, the capture module, the storage module, the reduction module, and the send module.

The functions of these various modules are described in detail below, with reference to the method steps described with reference to FIGS. 4 and 5.

Figure 4:
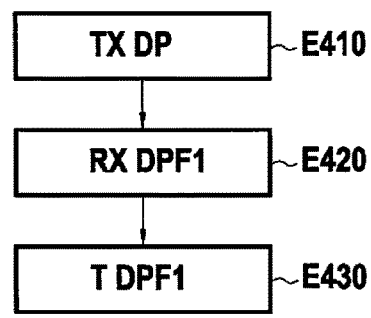

FIG. 4 shows a mixed reality method for displaying at least one virtual object in an implementation of the invention.

The method is performed by a first terminal, e.g. the first terminal 110 described with reference to FIGS. 1 and 3A.

In a step E410, the send module of the first terminal 110 sends at least one position data element DP of a pointer P positioned on a portion of a first window F1 of a computer application, the first window F1 being displayed by the second terminal 120.

Furthermore, in a step E420, at least one data element DPF1 relating to the first window portion F1 is received by the receive module of the first terminal 110.

In addition, in a step E430, the processor module processes at least one data element DPF1 relating to the portion of the first window F1 so as to display a virtual object in mixed reality on the basis of at least one data element DPF1 relating to the portion of the first window F1.

FIG. 5 shows a mixed reality display method for displaying at least one virtual object in another implementation of the invention.

The method is performed by a mixed reality display system for displaying at least one virtual object, e.g. the system 100 described with reference to FIG. 1.

In a step F500, the display device of the second terminal 120 displays a first window F1, possibly together with one or more other windows F2.

In a step E502, the first terminal 110 obtains one or more position data elements DPE from the display device of the second terminal 120 displaying the first window F1 in real surroundings ER in which the first terminal 110 and the second terminal 120 are located. This step E502 is performed by the obtaining module of the first terminal 110 and by the acquisition module.

The term "real surroundings" ER designates a space in which the second terminal 120 is positioned, together with the first terminal 110, during the obtaining step E502. Typically, the real surroundings ER are in the form of a room in a building.

The acquisition module of the first terminal 110 scans the real surroundings ER in three dimensions. Virtual surroundings EV are then modeled in three dimensions by the obtaining module on the basis of data from the acquisition module by using three-dimensional coordinates.

The term "virtual surroundings" EV is used herein to mean a digital space associated with a reference frame, typically a rectangular reference frame, representing the real surroundings ER in which the first terminal 110 and the second terminal 120 are positioned during the obtaining step 502, the representation being by means of three-dimensional coordinates.

The modeling makes it possible to obtain one or more position data elements DPE from the display device of the second terminal 120. More precisely, during the modeling, one or more sets of three-dimensional coordinates of the display device of the second terminal 120 in the virtual surroundings EV corresponding to the real surroundings ER can be obtained by the obtaining module.

In an example, in which the display device is a rectangular screen E, the three-dimensional coordinates of two opposite corners of the screen E can be obtained, e.g. the bottom left corner A of the screen E and the top right corner B (see FIG. 6), or indeed the top left corner and the bottom right corner. The height HAB and the width LAB of the screen E can then be deduced from the three-dimensional coordinates of the two opposite corners of the screen E.

The user of the first terminal 110 positions the pointer P of the pointer module of the first terminal 110 on a portion PF1 of the first window F1.

At least one position data element DP giving the position of the pointer can then be obtained by the first terminal 110 in a step E504, the pointer position data element DP possibly being a data element giving the position of the pointer relative to the display device. This step 504 may be performed by the obtaining module of the first terminal 110, and possibly also by the acquisition module.

More precisely, one or more sets of three-dimensional coordinates of the pointer P can be obtained by the obtaining module of the first terminal 110 in the virtual surroundings EV corresponding to the real surroundings ER. The obtained set(s) of three-dimensional coordinates may be used in order to calculate the position data element(s) DP of the pointer relative to the display device.

In the example of FIG. 6 where the display device is a rectangular screen E, several position data elements DP for the pointer P may be obtained relative to a point on the screen, e.g. the vertical component HAP and the horizontal component LAP corresponding to the algebraic distance of the pointer P relative to a point situated at a corner of the screen (typically the origin of a rectangular reference frame), typically the bottom left corner A of the screen.

The position data element(s) DP for the pointer P are then sent in a step E510 by the send module of the first terminal 110 and may be received (step F510) by the receive module of the second terminal 120.

This send step E510 may be performed when the first terminal 110 detects a command C to display a virtual object (step E506).

In this example, the display command C is a gesture made by the user U, typically a grasping movement, e.g. a movement of grasping the portion PF1 of the first window F1, as shown in FIG. 2A. The acquisition module of the first terminal 110 can then acquire one or more images or videos including the user's gesture. The image(s) or video(s) can then be analyzed by the processor module of the first terminal 110 in order to detect the gesture.

In another example, the display command C is a voice command, detected by analyzing audio data acquired by the first terminal 110.

In yet another example, the display command C is an action on a control peripheral of the first terminal 110, which peripheral may for example be a button or a touch surface. When the first terminal 110 is a pair of mixed reality goggles, the control peripheral may be positioned on the temple branches of the goggles.

After the receive module of the second terminal 120 has received the position data element(s) DP for the pointer P (step F510), the processor module of the second terminal 120 acts in a step F512 to determine the portion PF1 of the first window F1 on the basis of the position data element(s) DP of the pointer P.

In an example, the portion PF1 of the first window F1 is a pane, a bar, or a tab of the first window F1. The portion PF1 of the first window F1 is thus typically a navigation tab or an address bar. In another example, the portion PF1 of the first window F1 is constituted by the first window F1 in full.

More precisely, in a sub-step of the step F512, the processor module compares the position data element(s) DP with one or more position data elements of one or more portions of each window displayed by the display device of the second terminal 120. The processor module can then find the portion PF1 of the first window F1 on which the user has placed the pointer P of the pointer module of the first terminal 110.

This comparison is optionally preceded by a sub-step of determining the position of the pointer P on the screen.

In the example of FIG. 6 where the display device is a rectangular screen E, in step F510 the receive module may receive the height HAB of the screen E, the width LAB of the screen E, the vertical component HAP corresponding to the algebraic distance of the pointer P relative to a point situated at a corner of the screen E (typically the bottom left corner) and the horizontal component LAP corresponding to the algebraic distance of the pointer P relative to the same point. The coordinates of the pointer P(X,Y) can then be obtained by means of the following formulas:

$$X=Rx*LAP/LAB; \text{ and}$$

$$Y=Ry*HAP/HAB;$$

in which Rx and Ry designate the resolution of the screen.

Thus, the coordinates of the pointer P(X,Y) can be obtained even when the first terminal 110 does not know the resolution of the screen of the second terminal 120.

In a variant, the steps E502, E504, E506, E510, F510, and/or F512 are not performed, and the processor module of the second terminal 120 determines the portion PF1 of the first window F1 from one or more position data elements of a pointer of a pointer module of the second terminal 120. In this variant, the pointer module of the second terminal may for example be a computer mouse.

Once the portion PF1 of the first window F1 has been determined, the portion PF1 of the first window F1 may be captured in a digital image format, by the capture module of the second terminal 120 (step F514).

Also, one or more context data elements DC relating to the portion PF1 of the first window F1 and/or one or more metadata elements MET relating to the portion PF1 of the first window F1 may be stored in the rewritable nonvolatile memory 314 of the second terminal 120, by a storage module of the second terminal 120 (step F516).

Each context data element DC may be a data element describing the computer application, and can thus indicate the type, the name, and the version number of the computer application. Each context data element may also indicate a display size, a language, a type of connectivity used, etc.

For a text processor application, each context data element may also be a data element describing the document, and may for example specify the author of the document.

Furthermore, each metadata element MET may be a data element about the portion PF1 displayed by the display device of the second terminal 120. Thus, for a word processor application, each metadata element may comprise text displayed in the portion of the first window, a displayed current page number, a selected font, a font size, a clipboard content, etc.

Also, in a step F518, the portion of the first window F1 displayed by the display device of the second terminal 120 is reduced by the reduction module of the second terminal 120. When the portion PF1 of the first window F1 is constituted by all of the first window F1, the first window F1 is reduced to the size of an icon that is displayed by the display device of the second terminal 120. In a variant, the second terminal 120 stops displaying the first window F1.

In a step F520, the send module of the second terminal 120 sends one or more data elements DPF1 relating to the portion PF1 of the first window F1 that was determined in the step F512. By way of example, the capture of the portion PF1 of the first window F1 in a digital image format and/or the context data element(s) and/or the metadata element(s) may be sent during this step F520.

After the receive module of the first terminal 110 has received the data DPF1 relating to the portion PF1 of the first window F1 (step E520), the processor module of the first terminal 110 acts in a step E530 to process the received data element(s) DPF1 so as to display a virtual object OV in mixed reality on the basis of this data element(s) DPF1. In this processing step E530, the three-dimensional coordinates of the virtual object OV may be defined.

In a step E532, the virtual object OV is displayed by the display device of the first terminal 110.

More precisely, the virtual object OV may be displayed by the display device of the first terminal 110 in such a manner that the user U of the first terminal 110 can see this virtual object OV on the first terminal 110 superposed on the real surroundings ER.

When the first terminal 110 is a pair of mixed reality goggles or a mixed reality headset, the display device is a transparent or semitransparent screen on which the virtual object OV is displayed in the step E532. The screen is mounted on the goggles or the headset in such a manner that when the user U wears the goggles or the headset, the user sees the virtual object OV displayed on the screen together with the real surroundings ER through the screen.

When the first terminal 110 is a mobile terminal such as a mobile telephone or a digital tablet, the display device is a screen that acts in the step E532 to display the virtual object OV superposed on an image derived from the real surroundings ER, typically as acquired by a camera of the mobile terminal.

By way of example, the virtual object OV is displayed in such a manner that for the user U of the first terminal 110, the virtual object OV appears to be spaced apart from the display surface of the display device of the second terminal 120. The virtual object OV may thus appear somewhere around the display surface of the display device of the second terminal 120, e.g. above, below, to the left, and/or to the right. The three-dimensional coordinates of the vertical object OV may then be defined during processing step E530 as a function of the position data element(s) DPE of the display device of the second terminal 120, as obtained in step E502.

In an example, the displayed virtual object OV is the capture of the portion PF1 of the first window in a digital image format. In a variant, the virtual object OV may be a video.

In another example, the processor module creates the virtual object OV from the context data element(s) and/or the metadata element(s). During the time taken by processing, i.e. before displaying the virtual object OV, the capture of the portion PF1 of the first window may be displayed by the display device of the first terminal 110.

The virtual object may then be a second window of the computer application suitable for being displayed in mixed reality (see for example the window F3 of FIG. 2B), e.g. in the form of a hologram, or it may be a three-dimensional representation of a service of the computer application corresponding to the portion PF1 of the first window and suitable for being displayed in mixed reality (typically in the form of a hologram).

When the virtual object OV is a second window, the processor module displays one or more metadata elements and may make use of one or more context data elements in order to define the shape and the ergonomics of the second window. Thus, in an example where the portion PF1 of the first window F1 is a window, a pane, a bar, or a navigation tab, the virtual object OV may be a second window, possibly similar to the portion PF1 and displaying substantially the same content as the portion PF1.

In other examples, the content, the shape, and/or the ergonomics of the virtual object OV may differ from those of the portion PF1. Thus, when the portion PF1 of the first window F1 is a two-dimensional image, the virtual object OV may be a photo frame including the image.

In a step E534, the user U can interact with the virtual object OV, by means of the first terminal 110. The interaction may comprise moving the virtual object OV, and/or modifying the content of the virtual object.

For example, if the virtual object OV is a video, the modification of the content is playing back the video.

In another example, when the virtual object OV is a second word processor window, the user may use a virtual keyboard of the first terminal 110 in order to modify its content.

The content modification may then be transmitted to the second terminal 120, for synchronization purposes.

The steps of the present method may be reiterated in order to display a plurality of virtual objects OV.

The invention claimed is:

1. A method of displaying in mixed reality at least one virtual object, said method comprising the following acts performed by a first terminal:
    obtaining at least one position data element of a display device of a second terminal displaying a first window of a computer application, in real surroundings in which the first terminal and the second terminal are positioned, the real surroundings being scanned in three dimensions and virtual surroundings being modeled in three dimensions on the basis of the scanned data by using three dimensions coordinates, the at least one position data element of the display device being a set of three-dimensional coordinates of the display device in the virtual surroundings;
    obtaining at least one position data element of a pointer positioned on a portion of the first window, said at least one position data element of the pointer being a position data element for the pointer relative to the display device;
    sending, to the second terminal, the at least one position data element of the pointer;
    receiving, from the second terminal, at least one data element relating to said portion of the first window; and
    processing said at least one data element relating to said portion so as to display said at least one virtual object in mixed reality on the basis of said at least one data element relating to said portion.

2. The method according to claim 1, wherein the at least one virtual object is a second window of the computer application.

3. The method according to claim 1, wherein the sending is performed on detecting a command for displaying the at least one virtual object.

4. The method according to claim 1, wherein the receiving comprises receiving at least one of:
    at least one capture of said portion of the first window in a digital image format;
    at least one context data element relating to said portion of the first window; or
    at least one metadata element relating to said portion of the first window.

5. The method according to claim 1, wherein the first terminal is a mixed reality headset or a pair of mixed reality goggles.

6. The method according to claim 1, further comprising the second terminal reducing the portion of the first window.

7. The method according to claim 6, further comprising the second terminal determining said portion of the first window from said at least one position data element of the pointer.

8. A mixed reality terminal comprising:
    a processor; and
    a non-transitory computer-readable medium comprising instructions stored thereon, which when executed by the processor configure the mixed reality terminal to perform acts comprising:
        obtaining at least one position data element of a display device of a second terminal displaying a first window of a computer application, in real surroundings in which the mixed reality terminal and the second terminal are positioned, the real surroundings being scanned in three dimensions and virtual surroundings being modeled in three dimensions on the basis of the scanned data by using three dimensions coordinates, the at least one position data element of the display device being a set of three-dimensional coordinates of the display device in the virtual surroundings;
        obtaining at least one position data element of a pointer positioned on a portion of the first window, said at least one position data element of the pointer being a position data element for the pointer relative to the display device;
        sending, to the second terminal, the at least one position data element of the pointer;
        receiving, from the second terminal, at least one data element relating to said portion of the first window; and
        processing said at least one data element relating to said portion so as to display at least one virtual object in mixed reality on the basis of said at least one data element relating to said portion.

9. A non-transitory computer readable data medium storing a computer program including instructions for executing a method of displaying in mixed reality at least one virtual object, when the instructions are executed by a processor of a first terminal, said method comprising the following acts performed by the first terminal:
    obtaining at least one position data element of a display device of a second terminal displaying a first window of a computer application, in real surroundings in which the first terminal and the second terminal are positioned, the real surroundings being scanned in three dimensions and virtual surroundings being modeled in three dimensions on the basis of the scanned data by using three dimensions coordinates, the at least one position data element of the display device being a set of three-dimensional coordinates of the display device in the virtual surroundings;
    obtaining at least one position data element of a pointer positioned on a portion of the first window, said at least one position data element of the pointer being a position data element for the pointer relative to the display device;
    sending, to the second terminal, the at least one position data element of the pointer;

receiving, from the second terminal, at least one data element relating to said portion of the first window; and processing said at least one data element relating to said portion so as to display said at least one virtual object in mixed reality on the basis of said at least one data element relating to said portion.

\* \* \* \* \*